United States Patent [19]

Akimoto et al.

[11] 4,342,855

[45] Aug. 3, 1982

[54] PROCESS FOR THE PRODUCTION OF POLYETHYLENE

[75] Inventors: Shinichi Akimoto; Akio Kimura, both of Sodegaura, Japan

[73] Assignee: Idemitsu Kosan Company Limited, Tokyo, Japan

[21] Appl. No.: 181,686

[22] Filed: Aug. 27, 1980

[51] Int. Cl.$^3$ .......................... C08F 4/02; C08F 10/02
[52] U.S. Cl. ............................... 526/124; 252/429 B; 252/429 C; 526/125; 526/142; 526/153; 526/352
[58] Field of Search ................ 526/124, 125, 153, 142

[56] References Cited

U.S. PATENT DOCUMENTS

| | | | |
|---|---|---|---|
| 3,161,628 | 12/1964 | Dost et al. | 526/142 |
| 3,238,146 | 3/1966 | Hewett et al. | 526/125 |
| 3,644,318 | 2/1972 | Diedrich et al. | 526/124 |
| 3,833,515 | 9/1974 | Amtmann et al. | 526/124 |
| 4,083,802 | 4/1978 | Matsuura et al. | 526/125 |

FOREIGN PATENT DOCUMENTS

| | | | |
|---|---|---|---|
| 1269067 | 3/1972 | United Kingdom | 526/124 |
| 1357474 | 6/1974 | United Kingdom | 526/124 |
| 1367087 | 9/1974 | United Kingdom | 526/153 |

Primary Examiner—Edward J. Smith
Attorney, Agent, or Firm—Frishauf, Holtz, Goodman & Woodward

[57] ABSTRACT

A process for the production of polyethylene characterized in that the polymerization is carried out in the presence of an alcohol and in the presence of a polymerization catalyst prepared from (A) a solid catalyst component containing at least titanium, magnesium, and chlorine; (B) trialkylaluminum of the formula $R^1{}_3Al$ wherein $R^1$ is an alkyl or cycloalkyl group; and (C) a chlorine-containing aluminum compound of the formula $R^2{}_n AlCl_{3-n}$ wherein $R^2$ is an alkyl or cycloalkyl group, and n is a real number of from 1 to 2.

27 Claims, No Drawings

PROCESS FOR THE PRODUCTION OF POLYETHYLENE

BACKGROUND OF THE INVENTION

The present invention provides a process for the production of polyethylene, and more particularly, an efficient process for the production of polyethylene with wide distribution of molecular weight by employing a specific catalyst and by carrying out the polymerization in the presence of an alcohol in the reaction system.

In general, polyethylene utilized for producing molded articles such as bottles, cable sheathing and ultra-thin films must be able to withstand the molding conditions while in the plastic state and be easily molded into a predetermined shape. Therefore, it is necessary to employ a polyethylene having a wide molecular weight distribution.

The process described in Japanese Patent Kokai Koho 48584/1973 or 7488/1979 has been known as a process by which polyethylene having wide molecular weight distribution and excellent moldability and the like can be produced. In the process of No. 48584, one component of the catalyst is prepared by reacting an inorganic magnesium compound with an inorganic compound of a metal selected from the II to VIII group of the Periodic Table and a titanium halide in the presence of an electron donor. However, since the preparation of this catalyst is difficult and requires much effort, and because the catalyst obtained thereby is of variable quality, the process employing such catalyst lacks reproducibility. Furthermore, the process has a disadvantage in that the distribution range of molecular weight of the product polyethylene is not sufficiently wide. The process of No. 7488 is complicated and inefficient and requires a very expensive plant since the polymerization reaction is carried out in two stages.

THE INVENTION

It is an object of our invention to provide a process that overcomes the aforenoted disadvantages of the conventional techniques and to develop an efficient process for the production of polyethylene having a wide distribution of molecular weight. We have discovered that if the polymerization reaction is carried out in the presence of a specific catalyst and in the presence of an alcohol, polyethylene having a wide distribution of molecular weight is obtained.

The present invention provides a process for the production of polyethylene, characterized in that the polymerization reaction is carried out in the presence of an alcohol and in the presence of a catalyst prepared from:

(A) a solid catalyst component containing at least titanium, magnesium and chlorine,
(B) trialkylaluminum of the following general formula:

$R^1_3Al$ wherein $R^1$ represents an alkyl or cycloalkyl group containing from 1 to 12 carbon atoms; and
(C) a chlorine-containing aluminum compound of the following general formula:

$R^2_nAlCl_{3-n}$ wherein $R^2$ represents an alkyl or cycloalkyl group containing from 1 to 12 carbon atoms, and n is a real number of from 1 to 2.

DETAILED DESCRIPTION OF THE INVENTION

The catalyst used in the present invention is prepared from the above components (A), (B) and (C). The component (A), namely the solid catalyst component containing at least titanium, magnesium and chlorine includes various types of compounds without any specific restrictions. For example, the component (A) can be obtained by reacting a magnesium compound such as magnesium dialkoxide of the following general formula:

$Mg(OR^4)_2$ wherein $R^4$ represents a straight or branched alkyl, alkenyl, aryl, cycloalkyl, arylalkyl or alkylaryl group containing from 1 to 20, preferably 1 to 8 carbon atoms, with a chlorine-containing titanium compound of the following general formula:

$Cl_mTi(OR^5)_{4-m}$ wherein $R^5$ represents an alkyl or aryl group containing from 1 to 10 carbon atoms, and m is a real number of from 1 to 4. Preferred examples of the magnesium dialkoxide of the general formula $Mg(OR^4)_2$ include magnesium dimethoxide, diethoxide, dipropoxide, dibutoxide, dicyclohexoxide, dibenzoxide and the like. Illustrative chlorine-containing titanium compounds of the general formula $Cl_mTi(OR^5)_{4-m}$ include, for example, titanium tetrachloride (TiCl$_4$), trichloromethoxytitanium (CH$_3$OTiCl$_3$), trichloroethoxytitanium (C$_2$H$_5$OTiCl$_3$), trichloropropoxytitanium (C$_3$H$_7$OTiCl$_3$), dichloridiethoxytitanium ((C$_2$H$_5$O)$_2$TiCl$_2$), monochlorotriethoxytitanium ((C$_2$H$_5$O)$_3$TiCl) and the like. Among the foregoing, the compounds having a high chlorine content are preferable and titanium tetrachloride is most preferred.

Although the solid catalyst component (A) can be prepared by reacting the magnesium dialkoxide with the chlorine-containing titanium compound as described above, it is preferably prepared by reacting the chlorine-containing titanium compound described above with a magnesium compound which was obtained previously by reacting the magnesium alkoxide described above with silicon tetrachloride (SiCl$_4$) etc.

The composition of the component (A) (solid catalyst component) obtained by one of the processes described above may vary through a wide range and is limited only by containing at least titanium, magnesium and chlorine. Preferably the content of titanium atoms in the slurry polymerization reaction system is from 0.001 to 10 millimoles per liter, especially from 0.005 to 1 millimole per liter.

Illustrative examples of the component (B), i.e. the trialkylaluminum of the general formual $R^1_3Al$, include trimethylaluminum, triethylaluminum, triisopropylaluminum, triisobutylaluminum, trioctylaluminum and the like.

Illustrative examples of the compnent (C), i.e. the chlorine-containing aluminum compound of the general formula $R^2_nAlCl_{3-n}$ include diethylaluminum monochloride, diisopropylaluminum monochloride, diisobutylaluminum monochloride, dioctylaluminum monochloride, ethylaluminum dichloride, propylaluminum dichloride and the like.

In the preparation of the catalyst, the components (B) and (C) described above may be added separately or in admixture to the component (A). The total amount of the components (B) and (C) ranges preferably from 5 to 200 (mole ratio) and more preferably 20 to 100 (mole ratio), based on titanium atom in the component (A). The mixing ratio of the components (B) and (C) has no broad limitations, but the ratio of the component B/C should be selected generally within the range from 20 to 1/20, preferably from 5 to 1/5 (mole ratio).

It is necessary in the process of the present invention that the catalyst prepared from the above components (A), (B) and (C) be used and that an alcohol is present in the polymerization reaction system. If an alcohol is not present in the reaction system, the distribution of the molecular weight of polyethylene will be no longer wide and the object of the present invention cannot be attained.

The amount of the alcohol which should be present in the reaction system is determined depending upon the desired molecular weight distribution of polyethylene. It can be determined empirically, and it oridinarily should be within the range from 0.05 to 10 (mole ratio), preferably from 0.1 to 5 (mole ratio), based on the total amount of the components (B) and (C). The effect of increase in the melt flow ratio (F.R.) is not present when the mole ratio is below the range described above, while the activity of the catalyst is very much lowered when the mole ratio is beyond the range.

The alcohol may be previously added to the above component (A) or mixed with the component (B) and-/or component (C). Alternatively, the alcohol can be added directly to the reaction system during the polymerization of ethylene rather than in the preparation stage of the catalyst.

The alcohol, which must be present in the reaction system, has no broad limitations. It is usually an alcohol of the general formula $R^3OH$, wherein $R^3$ represents an alkyl, cycloalkyl or aralkyl group having 1–20 carbon atoms. As alcohols, there may be mentioned for example an aliphatic alcohol such as ethanol, n-propanol, isopropanol, n-butanol, isobutanol, sec-butanol, tert-butanol, 2-ethylhexanol, 1-dodecanol, etc., a cycloaliphatic alcohol such as cyclohexanol, etc., or an aralkyl such as benzyl alcohol, etc.

When ethylene is polymerized in accordance with the process of the present invention, the catalyst prepared from the above components (A), (B) and (C) and the alcohol are added to the reaction system, and then ethylene is introduced into the system. The procedure and conditions of the polymerization are not limited. Polymerization in solution, suspension, or vapor phase can be employed and carried out either continuously or discontinuously. As the medium of the reaction system, an inert solvent such as butane, pentane, n-hexane, cyclohexane, heptane, benzene, toluene, etc. is preferred. Polyethylene can be obtained by reacting ethylene at ethylene pressure of from 2 to 50 Kg/cm$^2$, preferably from 5 to 20 Kg/cm$^2$, preferably from 5 to 20 Kg/cm$^2$, at reaction temperatures of from 20° to 200° C., preferably from 50° to 150° C. for 10 min. to 5 hrs., preferably for 30 min. to 3 hrs. The regulation of molecular weight in the polymerization can be carried out by a conventional method, for example, by adding hydrogen, etc.

The process of the present invention produces polyethylene which is the homopolymer of ethylene and also a copolymer of ethylene with an α-olefin such as propylene, butene-1, 4-methyl-1-pentene, etc.

Because of use of the catalyst described hereinbefore and the use of the alcohol, the activity of the catalyst is very high and a small amount of the catalyst is sufficiently effective so as to permit omitting the stage of removing the catalyst. The product polyethylene has a large apparent density, a suitable particle size and a very low content of fine powder, and a wide range of molecular weight distribution. Therefore, the product polyethylene has very good moldability and excellent physical properties.

Since the molecular weight distribution of the product polyethylene is controlled within the desired range by suitable selection of the mixing ratio of the catalyst, the amount of the alcohol which is added, the polymerization conditions and the like, the process of the present invention is highly effective.

Illustrative examples of the present invention follow, in which all procedures are carried out under an argon atmosphere. The molecular weight distribution is evaluated by the melt flow ratio (F.R.), namely the ratio of the melt index under a load of 21.6 kilograms to the melt index under a load of 2.16 kilograms.

EXAMPLE 1

Preparation of a solid catalyst component

Into a 500 milliliters four-neck flask, 150 milliliters of dry hexane, 10 grams (88 millimoles) of magnesium diethoxide and 3.7 grams (22 millimoles) of silicon tetrachloride were introduced. After 2.0 grams (33 millimoles) of isopropyl alcohol was added dropwise at 20° C. over the period of 1 hour, the temperature of the mixture was elevated and the reaction was carried out at 68° C. for 2 hours. Then, 42 grams (220 millimoles) of titanium tetrachloride was added dropwise and the reaction was conducted under reflux for 3 hours. After the termination of reaction, the reaction mixture was cooled to room temperature and allowed to stand. The supernatant was drawn out and added to 250 milliliters of dry hexane, and the mixture after stirring was allowed to stand. The supernatant was drawn out and added to 250 milliliters of dry hexane, and the mixture after stirring was allowed to stand. The supernatant was drawn out. This cycle of the operations was repeated 5 times, so that a slurry of the catalyst was obtained. The amount of titanium in the solid catalyst was 62 milligrams of Ti per gram of magnesium diethoxide as determined by colorimetry.

Polymerization of ethylene

Into a 1 liter stainless steel autoclave, 400 millimoles of dry hexane, 1.5 millimoles of triethylaluminum (TEA) and 1.5 millimoles of diethylaluminum chloride (DEAC) were introduced. Then, 0.0025 millimole (calculated as Ti) of the solid catalyst component and 1.0 millimole of ethanol as alcohol were added and the mixture was heated up to 80° C. After charging 1 Kg/cm$^2$ of hydrogen and 7 Kg/cm$^2$ of ethylene, ethylene was polymerized for 1 hour while maintaining the above-described pressure by continuous addition of further ethylene. As a result, 128.8 grams of polyethylene was obtained. The activity of the catalyst was 1076 kilograms of polyethylene per gram of titanium atom per hour. The polyethylene product had a high apparent density of 0.33, a melt index (MI$_{2.16}$) of 0.075, a F.R. of 44 and a content of fine powder below 105μ of 5.3 wt%.

COMPARATIVE EXAMPLE 1

Ethylene was polymerized under the same conditions as in Example 1, except that ethanol was not added. As a result, 117.3 grams of polyethylene was obtained. The activity of the catalyst was 980 kilograms of polyethylene per gram of titanium atom per hour. The obtained polyethylene had an apparent density of 0.29, a melt index ($MI_{2.16}$) of 0.079 and a F.R. of 33. These characteristics have lower values than those for the product of Example 1 in which ethanol was added.

EXAMPLES 2 TO 13 AND COMPARATIVE EXAMPLE 2

Ethylene was polymerized by use of the solid catalyst component of Example 1 and under different conditions of the polymerization as reported in Table 1. The results are also reported in Table 1. The polymerization was carried out at 80° C. for 1 hr.

0.005 millimole of the solid catalyst (calculated as Ti) were introduced. Then, 1.0 millimole of ethanol was added and the mixture heated up to 80° C. After charging 1 kilogram per square centimeter of hydrogen and 7 kilograms per square centimeter of ethylene, the polymerization was carried out for 1 hour while maintaining the pressure of ethylene. As a result, 139.5 grams of polyethylene was obtained. The activity of the catalyst was 581 kilograms of the polyethylene produced per gram of titanium atom per hour. The product polyethylene had a melt index ($MI_{2.16}$) of 0.18, a a F.R. of 41 and an apparent density of 0.33.

When the polymerization was carried out under the same conditions as described in the preceding paragraph, except that ethanol was not added, 147.3 grams of polyethylene was obtained which had a melt index ($MI_{2.16}$) of 0.16 and an F.R. of 31.

EXAMPLE 15

TABLE 1

| No. | TEA (milli-mole) | DEAC (milli-mole) | Alcohol Name | Alcohol Amount (milli-mole) | Ti (milli-mole) | Pressure (kg/cm²) ethylene | Pressure (kg/cm²) hydrogen | Yield of polyethylene (gram) | Activity* | Apparent Density | $MI_{2.16}$ | F.R. |
|---|---|---|---|---|---|---|---|---|---|---|---|---|
| Example 2 | 1.5 | 1.5 | ethanol | 0.5 | 0.0025 | 7 | 1 | 150.0 | 1250 | 0.33 | 0.082 | 41 |
| Example 3 | " | " | " | 1.5 | " | " | " | 108.4 | 903 | 0.31 | 0.018 | 69 |
| Example 4 | " | " | iso-propanol | 1.5 | " | " | " | 115.0 | 960 | 0.32 | 0.020 | 70 |
| Example 5 | " | " | t-butanol | 1.0 | 0.010 | 6.5 | 1.5 | 155.0 | 323 | 0.29 | 0.10 | 37 |
| Example 6 | " | " | 2-ethyl-hexanol | 1.0 | 0.005 | " | " | 171.7 | 717 | 0.32 | 0.088 | 51 |
| Example 7 | " | " | cyclo-hexanol | 1.0 | 0.0025 | 7 | 1 | 121.4 | 1014 | 0.31 | 0.018 | 76 |
| Example 8 | " | " | 1-dode-canol | 1.0 | 0.010 | 6.5 | 1.5 | 115.3 | 240 | 0.28 | 0.20 | 34 |
| Example 9 | " | " | benzylal-cohol | 1.0 | " | " | " | 180.5 | 377 | 0.22 | 0.15 | 40 |
| Example 10 | 0.09 | 0.21 | ethanol | 1.0 | 0.0025 | 6.7 | 1.3 | 64.4 | 537 | 0.32 | 0.021 | 67 |
| Example 11 | " | " | 2-ethyl-hexanol | 1.0 | 0.014 | 5 | 3 | 141.8 | 211 | 0.29 | 0.36 | 50 |
| Example 12 | " | " | cyclo-hexanol | 1.0 | 0.010 | 6 | 2 | 190.6 | 397 | 0.30 | 0.35 | 37 |
| Example 13 | " | " | t-butanol | 1.0 | 0.010 | 6 | 2 | 57.6 | 120 | 0.25 | 0.037 | 44 |
| Comparative Example 2 | " | " | — | — | 0.010 | 6 | 2 | 192.0 | 400 | 0.31 | 0.53 | 32 |

*Activity: Amount of polyethylene produced per gram of titanium atom per hour (unit: kilogram)

EXAMPLE 14

Preparation of a solid catalyst component

A small amount (about 40 milliliters) of ethanol was mixed with a mixture of 33.7 grams (91 millimoles) of $MgCl_2 \cdot 6C_2H_5OH$ prepared from anhydrous magnesium chloride (dried at 150° C. under reduced pressure for 5 hours) and ethanol with 10.4 grams (91 millimoles) of $Mg(OC_2H_5)_2$ and heated at 160° C. under reduced pressure for 4 hours. The so-obtained solid was ground to give a starting support. A suspension of 5 grams of the obtained support in 100 milliliters of hexane was blended with 2.9 grams of isopropanol and reacted at 70° C. for 1 hour. After 23 grams of $TiCl_4$ was added dropwise at 70° C. within 1 hour, the reaction was carried out at 70° C. for 3 hours. After cooling the reaction mixture to room temperature, the supernatant was drawn out and washed with 150 milliliters of hexane. Washing was repeated until Cl ions were not detected in hexane, and finally 300 milliliters of hexane was added to give a slurry of the catalyst. The amount of titanium was 285 milligrams of Ti per gram of support.

Polymerization of ethylene

Into a 1 liter-autoclave, 400 milliliters of dry hexane, 1.5 millimoles of TEA, 1.5 millimoles of DEAC and Ethylene was polymerized under the same conditions as described in Example 14, except that 1.5 millimoles of ethyl aluminum dichloride (EADC) was used instead of DEAC. As a result, 35.3 grams of polyethylene was obtained. The activity of the catalyst was 147 kilograms of the obtained polyethylene per gram of titanium atom per hour. The product had a melt index ($MI_{2.16}$) of 0.077, a F.R. of 49 and an apparent density of 0.27.

When the polymerization was carried out under the same conditions as described in the preceding paragraph, except that ethanol was not added, 51.0 grams of polyethylene was obtained which had melt index ($MI_{2.16}$) of 0.090 and F.R. of 33.

We claim:

1. In the process for producing polyethylene comprising polymerizing ethylene in the presence of an ethylene polymerization catalyst, the improvement comprising
(i) carrying out said polymerization in the presence of an alcohol; and
(ii) said polymerization catalyst comprising:
(A) a solid catalyst component containing at least titanium, magnesium and chlorine, (B) trialkylaluminum of the formula $$R^1{}_3Al$$

wherein $R^1$ is an alkyl or cycloalkyl group containing from 1 to 12 carbon atoms; and
(C) a chlorine-containing aluminum compound of the formula $$R^2{}_n AlCl_{3-n}$$

wherein $R^2$ is an alkyl or cycloalkyl group containing from 1 to 12 carbon atoms, and n is a real number of from 1 to 2;
said solid catalyst component (A) is obtained by reacting the (1) reaction product of magnesium dialkoxide of the formula $$Mg(OR^4)_2$$

wherein $R^4$ is an alkyl, alkenyl, aryl, cycloalkyl, arylalkyl or alkylaryl group containing from 1 to 20 carbon atoms, and (2) silicon tetrachloride, with a chlorine-containing titanium compound of the formula $$Cl_m Ti(OR^5)_{4-m}$$

wherein $R^5$ is an alkyl or aryl group containing from 1 to 10 carbon atoms, and m is a real number of from 1 to 4.

2. The process of claim 1 wherein said alcohol is present in a mole ratio of from 0.05 to 10 based upon the total amount of said components (B) and (C) present.

3. The process of claims 1 or 2 wherein the amount of titanium in said polymerization catalyst is from 0.001 to 10 millimoles per liter of the contents of the polymerization reaction mixture.

4. The process of claim 3 wherein the total amount of said components (B) and (C) is from 5 to 200 moles per atom of titanium in the said component (A).

5. The process of claim 4 wherein said alcohol has the formula $R^3OH$ and wherein $R^3$ is an alkyl, cycloalkyl or aralkyl group having from 1 to 20 carbon atoms.

6. The process of claim 1 wherein said alcohol has the formula $R^3OH$ and wherein $R^3$ is an alkyl, cycloalkyl or aralkyl group having from 1 to 20 carbon atoms.

7. The process of claim 4 wherein the ratio of said component (B) to said component (C) is form 20:1 to 1:20.

8. The process of claim 6 wherein said alcohol is present in a mole ratio of from 0.1 to 5 based upon the total amount of said components (B) and (C); and the ratio of said components is between 5:1 and 1:5.

9. The process of claim 8 wherein said ethylene is polymerized at an ethylene pressure of from 2 to 50 Kg/cm² and at a reaction temperature of from 20° to 200° C. for between about 10 minutes and 5 hours.

10. The process of claim 9 wherein the amount of titanium in said polymerization catalyst is from 0.005 to 1 millimole per liter of the contents of the polymerization reaction system, and wherein the total amount of said components (B) and (C) is from 20 to 100 moles per atom of titanium in said component (A).

11. The process of claim 1 wherein said ethylene is polymerized at an ethylene pressure of from 2 to 50 Kg/cm² and at a reaction temperature of from 20° to 200° C. for between about 10 minutes and 5 hours.

12. The process of claim 2 wherein the amount of titanium in said polymerization catalyst is from 0.005 to 1 millimole per liter of the contents of the polymerization reaction system, and wherein the total amount of said components (B) and (C) is from 20 to 100 moles per atom of titanium in said component (A).

13. The process of claim 1 wherein said magnesium dialkoxide is magnesium diethoxide.

14. The process of claim 1 wherein said chlorine-containing titanium compound is titanium tetrachloride.

15. The process of claim 1 wherein said magnesium dialkoxide is magnesium diethoxide and wherein said chlorine-containing titanium compound is titanium tetrachloride.

16. The process of claim 15 wherein said alcohol is present in a mole ratio of from 0.05 to 10 based upon the total amount of said components (B) and (C) present.

17. The process of claim 16 wherein the amount of titanium in said polymerization catalyst is from 0.001 to 10 millimoles per liter of the contents of the polymerization reaction mixture.

18. The process of claim 17 wherein the total amount of said components (B) and (C) is from 5 to 200 moles per atom of titanium in the said component (A).

19. The process of claim 18 wherein said alcohol has the formula $R^3OH$ and wherein $R^3$ is an alkyl, cycloalkyl or aralkyl group having from 1 to 20 carbon atoms.

20. The process of claim 19 wherein the ratio of said component (B) to said component (C) is from 20:1 to 1:20.

21. The process of claim 20 wherein said alcohol is present in a mole ratio of from 0.1 to 5 based upon the total amount of said components (B) and (C); and the ratio of said components is between 5:1 and 1:5.

22. The process of claim 21 wherein said ethylene is polymerized at an ethylene pressure of from 2 to 50 Kg/cm² and at a reaction temperature of from 20° to 200° C. for between about 10 minutes and 5 hours.

23. The process of claim 22 wherein the amount of titanium in said polymerization catalyst is from 0.005 to 1 millimole per liter of the contents of the polymerization reaction system, and wherein the total amount of said components (B) and (C) is from 20 to 100 moles per atom of titanium in said component (A).

24. The process of claim 1 wherein the ratio of said component (B) to said component (C) is from 20:1 to 1:20.

25. The process of claim 24 wherein said alcohol is present in a mole ratio of from 0.1 to 5 based upon the total amount of said components (B) and (C); and the ratio of said components is between 5:1 and 1:5.

26. The process of claim 25 wherein said ethylene is polymerized at an ethylene pressure of from 2 to 50 Kg/cm² and at a reaction temperature of from 20° to 200° C. for between about 10 minutes and 5 hours.

27. The process of claim 26 wherein the amount of titanium in said polymerization catalyst is from 0.005 to 1 millimole per liter of the contents of the polymerization reaction system, and wherein the total amount of said components (B) and (C) is from 20 to 100 moles per atom of titanium in said component (A).

* * * * *